Sept. 20, 1932.   A. C. LINDGREN   1,878,871
TRACTOR OPERATED PLANTER
Filed July 23, 1930   4 Sheets-Sheet 3
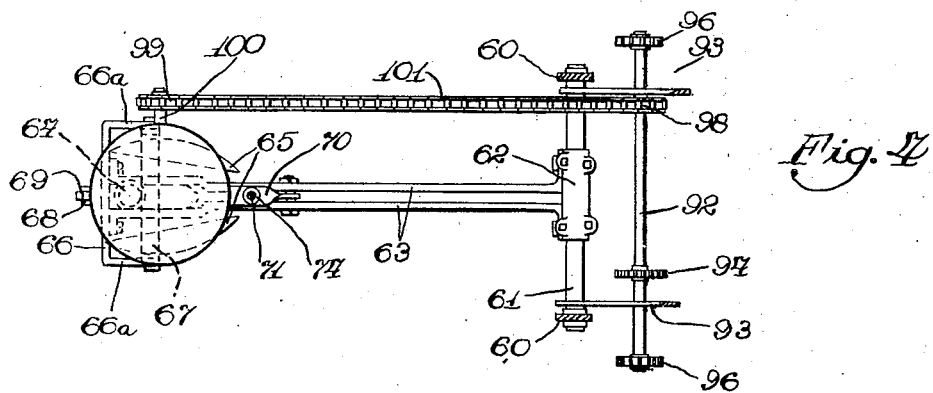
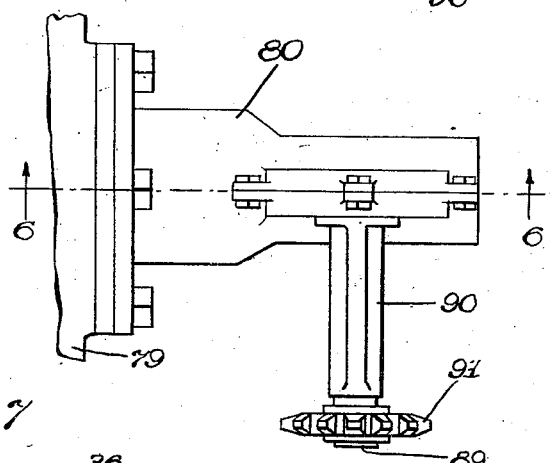
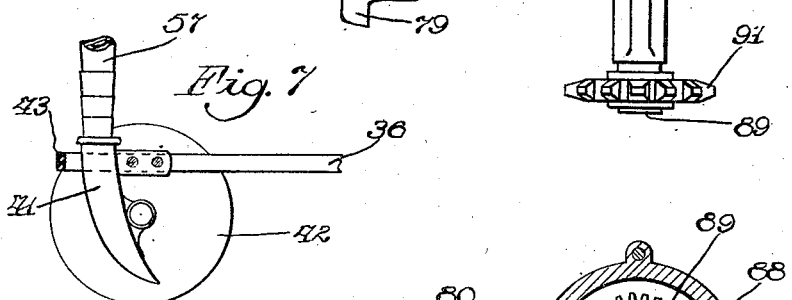
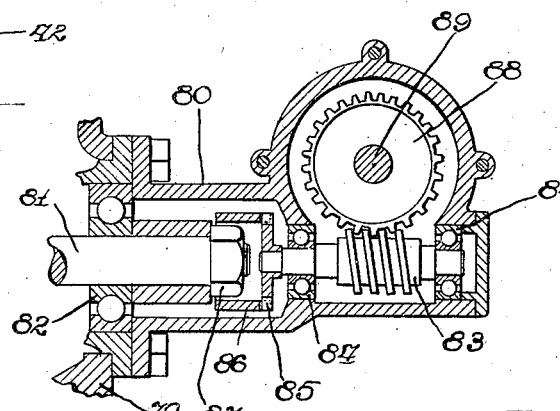
Inventor:
Alexis C. Lindgren

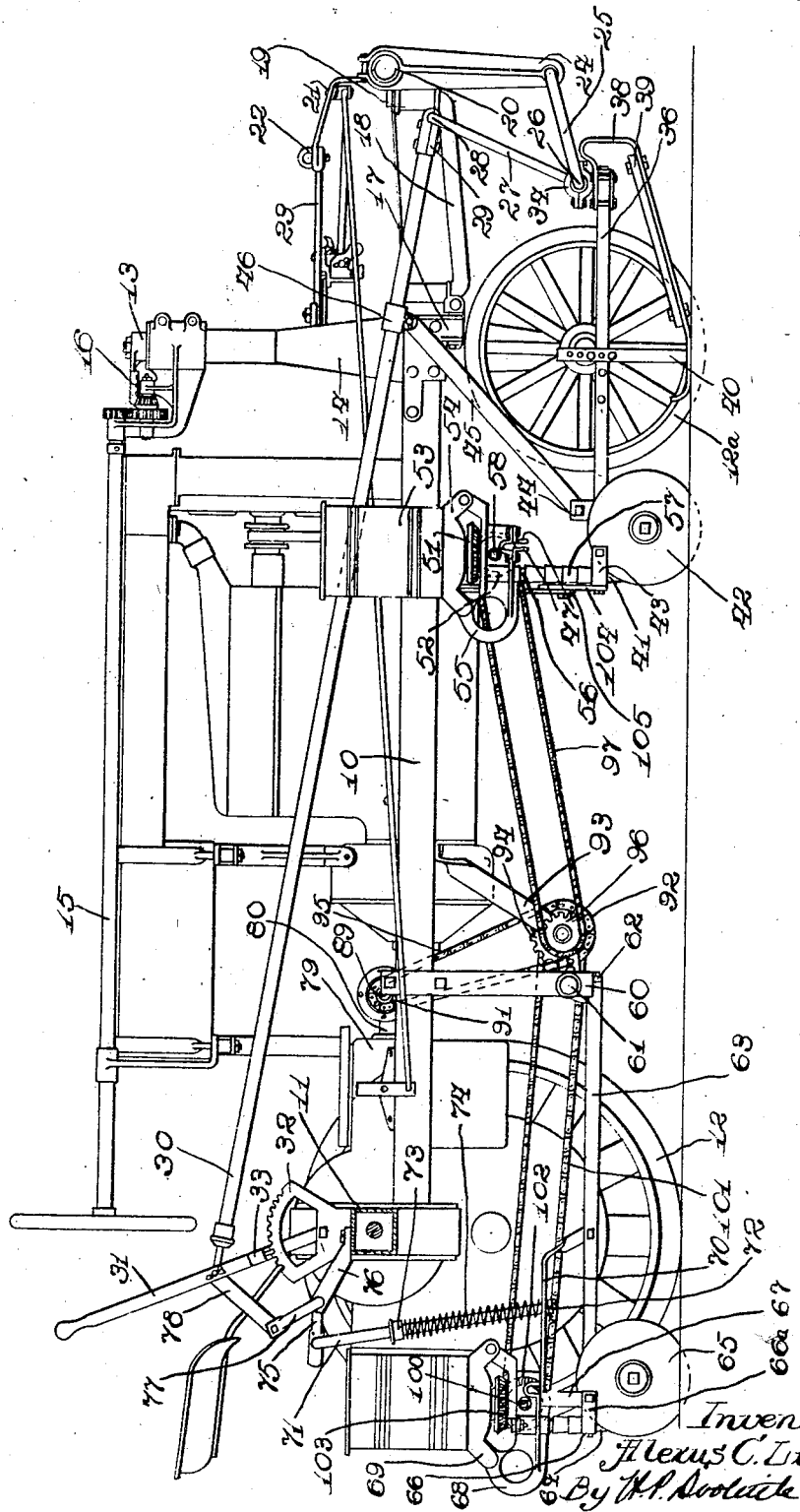

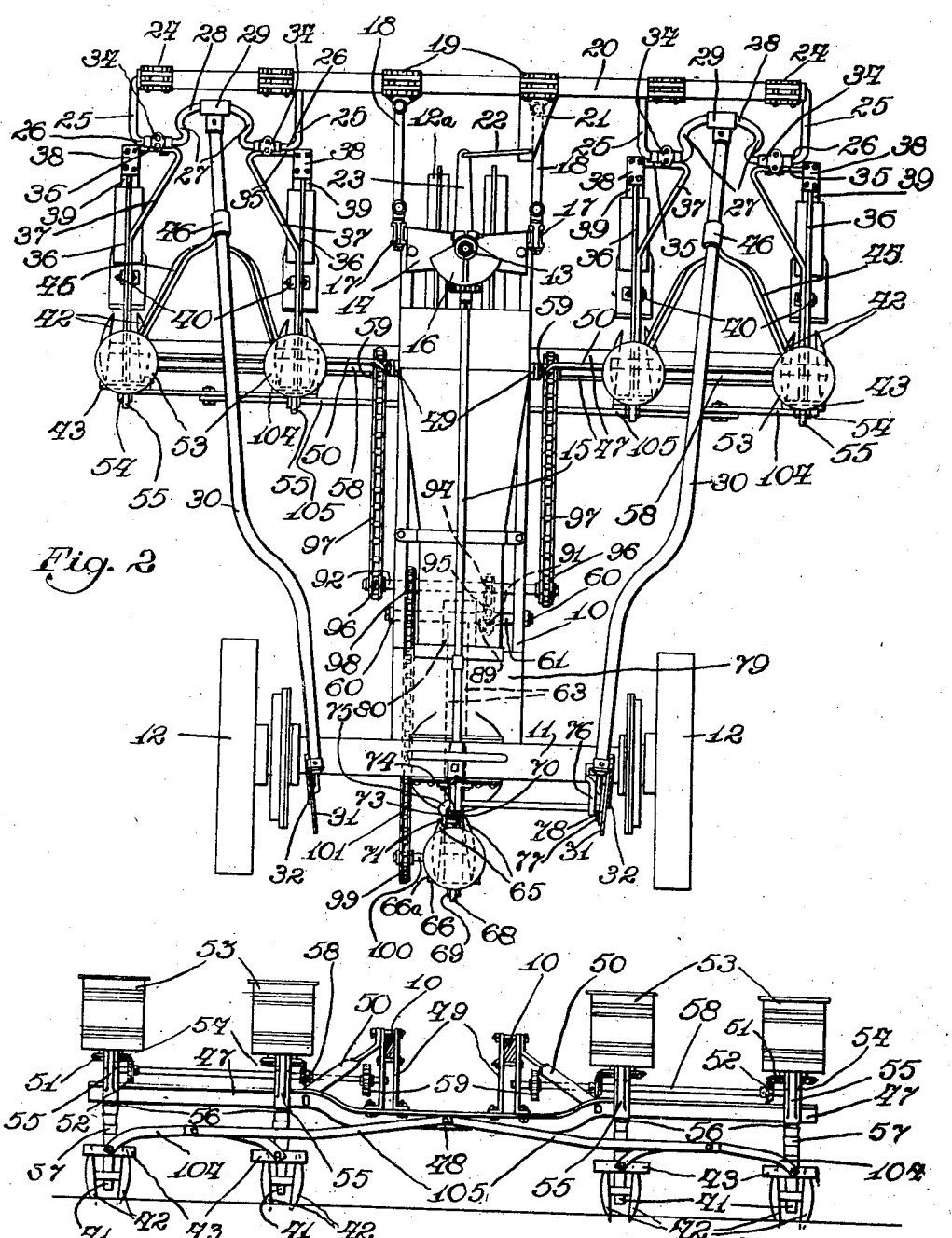

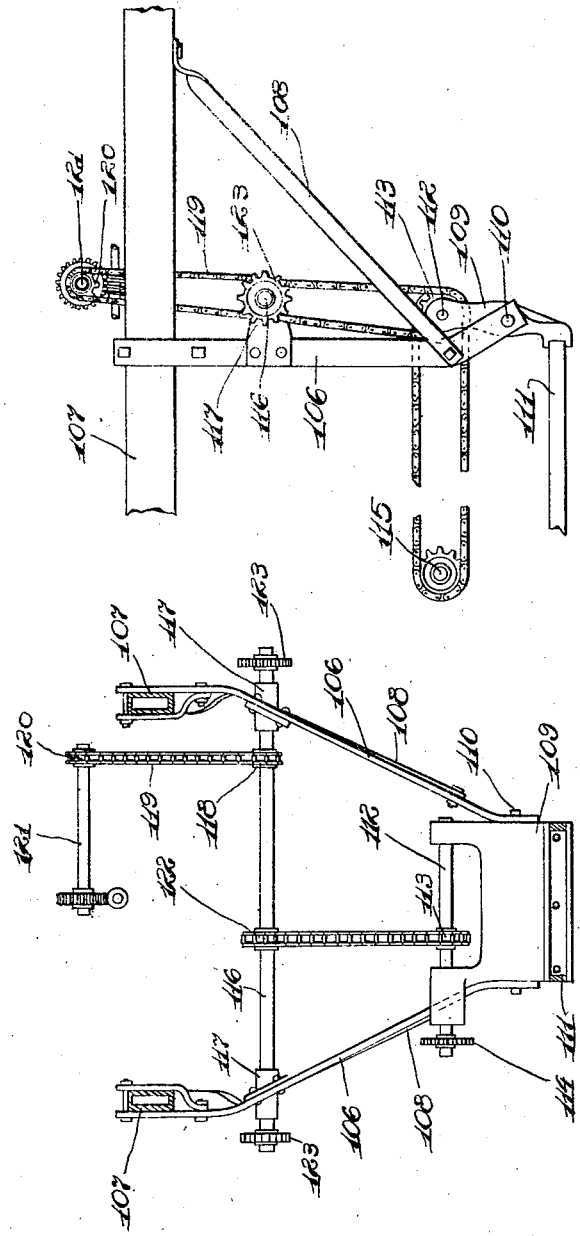

Patented Sept. 20, 1932

1,878,871

UNITED STATES PATENT OFFICE

ALEXUS C. LINDGREN, OF CHICAGO, ILLINOIS, ASSIGNOR TO INTERNATIONAL HARVESTER COMPANY, A CORPORATION OF NEW JERSEY

TRACTOR OPERATED PLANTER

Application filed July 23, 1930. Serial No. 469,959.

This invention relates to farm implements and is directed more particularly to grain planters adapted for attachment to and operation in conjunction with tractors.

The principal object of the invention is to provide means for attaching a plurality of planting units to farm tractors.

Further objects are to provide a structure that may be easily attached to existing types of tractors, that will have provisions for driving the planting mechanism from the tractor engine, and that will provide the desired arrangements of planter units for planting several rows at once.

The foregoing and other minor objects, which will be apparent, are attained by the provision of a structure having for its characteristic features of construction a transverse frame member attachable at its center to the front of the tractor frame in a manner to provide for lateral adjustment or movement, if desired, and having its ends projecting laterally beyond the sides of the tractor body.

Planter units are provided for attachment to said projecting ends. Means are also provided operable from the tractor operator's seat for lifting and lowering the planter units. To provide for planting an odd number of rows in this instance five, an additional planter unit is mounted at the rear of the tractor intermediate the driving wheels. Means operatively connected to the means for raising and lowering the forward planter units are provided for lifting the rearwardly positioned unit.

The invention accordingly resides in the organization and details of construction, or equivalents thereof, hereinafter more particularly described and defined in the claims.

In the drawings:

Figure 1 is a side elevation of a tractor with the planter of the invention attached in operative position. A section is taken through the rear axle housing, in order that the rearwardly positioned planter unit may be more clearly shown;

Figure 2 is a plan view of the same device shown in Figure 1;

Figure 3 is a plan view, looking forwardly of the forward planter units and the means for attaching them to the tractor frame;

Figure 4 is an enlarged detail showing a plan view of the rearwardly mounted unit and the means for driving said units;

Figure 5 is an enlarged detail showing the power take-off connection;

Figure 6 is a section taken on the line 6—6 of Figure 5;

Figure 7 is an enlarged detail showing diagrammatically the planter unit construction; and, Figures 8 and 9 are enlarged detail views of a modified drive for the planter units.

In the present instance the invention is illustrated as including a tractor of a type having a comparatively narrow longitudinal body frame 10 supported on rear axle structure 11, including widely spaced traction wheels 12. At the forward end of the frame 10 is supported a single, centrally positioned steering truck 12a. The steering truck includes an upright steering post 13 journaled in a front cross member 14, which transmits movement of the steering wheel and rod 15 to a rear sector 16 on the upper end of the steering post.

On the forward corners of the tractor frame at the ends of the cross member 14, supporting brackets 17 are provided. These brackets cooperate with coupling elements carrying pivotally mounted, forwardly extending supporting arms 18. These arms extend horizontally and at their forward ends are pivoted in clamp brackets 19, which support a transversely extending draft beam 20. The beam 20 projects laterally beyond each side of the tractor a sufficient distance to provide for attaching planter units of the desired number. The pair of arms 18 and the draft beam 20 provide a support which may be moved laterally with respect to the tractor. A rearwardly extending arm 21 is rigidly connected to the beam 20. A link 22 pivotally connects the end of the arm 21 with a lever arm 23 extending forwardly from the steering column 13. This construction provides means for moving the beam 20 and the implements attached thereto laterally simultaneously and in the same direction as the truck 20 is steered.

At each end of the draft beam 20, a pair of spaced, downwardly extending brackets 24 are rigidly attached. These brackets serve as draft means for drawing the implements connected thereto. An arched yoke of a peculiar construction is attached at each side of the tractor to each pair of the brackets 24. Each of these members is shaped with substantially horizontal portions 25 at each side, said portions being pivotally connected by bent end portions to the brackets 24. At the rear end of the horizontal portions 25, the members are bent to form horizontal transverse portions 26, which provide means for pivotally attaching the implement frames. From the inner ends of the portions 26, there are upwardly extending portions 27, as best shown in Figure 1. The upper ends of the portions 26 are connected by a substantially horizontal portion 28, thereby forming an arch. By means of a bracket 29 attached to the horizontal portion 28, a beam 30 is attached to the arched portion of the yoke. The beam 30 extends rearwardly and laterally inwardly to a point at the rear of the tractor where it is pivotally attached to a hand lever 31. The hand lever 31 is pivotally mounted at the base of a member 32 having a notched quadrant thereon. A latch mechanism 33, not shown in detail, is provided on the hand lever 31 for engaging the notches in the quadrant. The member 32 is rigidly mounted on the rear axle housing 11.

Bearing boxes 34 are provided on the transverse portions 26 of the arched yokes for pivotally attaching the implements to be drawn there-behind. In the particular construction shown, a frame structure consisting of a bar having a transverse portion 35, a right angle, rearward extension 36, and an angular portion 37 joining the transverse portion and the right angle extension 36 is connected to each of the bearing brackets 34. These frame structures form supports for furrow opening and seed depositing mechanisms. A depth regulating means consisting of a resilient member 38 is rigidly connected to the forward end of the frame structure and extends downwardly rearwardly thereunder. A stiffening member 39 is secured to the intermediate portions of the member 38. An upright bar 40 is secured to the soil engaging end of the member 38 and is adapted to be adjustably secured to the frame structure.

At the rear of the frame structure, means are provided for rigidly securing in position a seed depositing shoe 41 and a pair of angularly disposed disks 42, which serve as furow openers for the seed depositing means. A bar 43, secured to the frame structure, extends transversely behind the seed depositing shoe for a purpose to be hereinafter described.

An upstanding bracket 44 secured to each of the frame structures provides means for pivotally attaching a link 45, which at its upper end is pivotally connected to a bracket 46 mounted on the beam 30. As best shown in Figure 2, the links 45 slant upwardly together, so that the links of each pair of planter units may be connected to the same bracket 46 on the beam 30, which extends substantially centrally between the two units.

A pair of angle bars 47 are positioned transversely below the frame members 10 of the tractor a short distance rearwardly of the front wheels. The bars 47 have a dipped central portion 48 to provide clearance under the crank case of the tractor engine. Vertically arranged supporting brackets 49 and angularly extending bars 50 are rigidly secured to the bars 48 and to the side frame members 10 of the tractor. The bars 47 thus, rigidly secured in position with respect to the tractor frame, form a frame structure on which a series of seed dispensing units are mounted.

Each of the seed dispensing units consists of a seeding mechanism, not shown in detail, operated by the gears 51 and 52, a hopper 53 mounted on a base 54, and a seed discharging spout 56. The spout 56 discharges into a flexible conduit 57, which is inserted in the seed depositing shoe 41. The hopper base 54 is hinged on a casting 55, which is rigidly secured to the bars 47. The casting 55 also provides a support and bearings for a shaft 58, which extends above the bars 47 in parallel relation thereto. The construction at each side of the tractor is exactly similar. Each of the shafts 58 extends centrally and is provided with a bearing in one of the upright brackets 49. The gears 52, which drive the seeding mechanisms of the planter units, are mounted on the shafts 58. A chain sprocket 59 is also mounted on each of the shafts 58 for driving said shafts from a tractor power take-off, which will be hereinafter described in detail.

For maintaining the furrow opening and seed depositing means of the forward units in lateral alignment, a pivoted linkage is provided, as shown in Figure 3. An arched bar 104 is pivotally connected to the bars 43 secured to the rear of each of the frame structures which support the furrow opening and seed depositing means. The arch construction is the same on each side of the tractor and links 105 pivotally secured to the center of each of the bars 104 are pivotally connected to the center of the bars 47. By this construction the frame structures of the furrow opening means may float up and down with respect to each other, but are held against lateral displacement.

Each pair of the seed dispensing units arranged at the sides of the tractor are spaced apart the distance at which the grain is to be planted. The inner units, however, are spaced apart twice the distance of the rows. This construction necessitates a fifth unit for planting the intermediate row. This fifth unit is of a somewhat different construction and is mounted at the rear of the tractor. The forward seed dispensing units are mounted on a frame structure rigid with respect to the tractor frame and the seed is delivered to the furrow opening and seed depositing means, which are on floating frames adapted to follow the ground level. The rear unit construction differs in that the seed dispensing unit is mounted on the floating frame, which carries the furrow opening and seed depositing means.

A pair of flat bars 60, rigidly secured to the side frame members 10 of the tractor extend substantially vertically below the tractor frame. At the lower ends of said bars, a shaft 61 is pivotally mounted on a transverse axis. By means of a bearing bracket 62, the frame structure of the rear planter unit is pivotally mounted on the shaft 61.

The frame structure of the rear unit consists of a pair of parallel bars 63 having right angle extensions at their forward ends secured to the bracket 62. The rear end of the bars 63 are flared out to surround and embrace a member 64, which forms the seed depositing means and to which the furrow opening disks 65 are rotatably attached. A bar 66 is secured to lateral extensions at the rear of the bars 63. The bar 66 has forward extensions 66a, which provide means for attaching an arched member 67. The casting 68, which forms the support for the seeding mechanism and the hopper base 69, is mounted on the bars 66 and 67, which form the frame structure for supporting the planter unit. A forwardly extending bar 70 attached at a forward point to the bars 63 provides an additional means for supporting the member 68 and also provides means for attaching the lifting rod 71. The lifting rod 71 extends through an opening in the bar 70 and is provided with a stop 72 thereunder. A stop 73 above the bar 70, and a compression spring 74 provide means for allowing upward movement of the frame structure when obstructions are encountered in operation. The upper end of the lifting rod 71 has a right angled extension which is pivotally mounted in a crank 75. The crank 75 is on a shaft mounted in a bracket 76 rigidly secured to the rear axle housing 11. A second crank 77 on the same shaft is pivotally connected by a link 78 with the hand lever 31 previously described. It will be understood that the linkage described provides means for simultaneously lifting and lowering the forward units and the rear units into and out of operative position. The said linkage also provides for variable depth regulation.

For driving the mechanisms of the seed dispensing units, a specially designed jack shaft arrangement is utilized. From the forward side of the power transmission housing 79, a housing 80 is secured containing a shaft 81 mounted in a ball bearing assembly 82 extending from the housing 79. The housing 80 contains a worm 83 mounted in the ball bearing assemblies 84. The axis of the worm 83 is in alignment with the axis of the shaft 81. A notched disk 85 secured to one end of the worm shaft is adapted to engage a similarly notched sleeve 86. The sleeve 86 is adapted to operatively engage a nut 87 on the end of the shaft 82. A gear 88 mounted on a shaft 89 extending through the housing 80 is adapted to be operatively engaged by the worm 83. The shaft 89 extends through a lateral extension 90 attached to the housing 80 and is provided with a chain sprocket 91 at the end of the extension.

A jack shaft 92 is rotatably supported in a pair of spaced bracket bars 93, which are attached to the side frame members 10 of the tractor and are provided at their lower ends with openings through which the shaft 61 extends. By this construction, the bars 60 and the bracket bars 93 brace each other. The jack shaft 92 is provided with a chain sprocket 94 which is non-rotatively positioned thereon in alignment with the sprocket 91 on the shaft 89. A chain 95 operatively connects said sprockets.

A sprocket 96 at each end of the shaft 92 is positioned in alignment with the sprockets 59 on the shafts 58, which operate the seeder mechanisms. Chains 97 operatively connect the sprockets 96 and 59. A four inch chain sprocket 98 is mounted on the shaft 92. A sprocket 99 is positioned in alignment with the sprocket 98 on a shaft 100, which is mounted on the casting 68, which forms a part of the rear planter unit. A chain 101 operatively connects the sprockets 98 and 99. The shaft 100 carries a bevel gear 102 which is adapted to mesh with and drive the gear 103. Said gear drives a seeding mechanism of a conventional construction, not shown in detail.

In the modified form of drive shown in Figures 8 and 9, bars 106 clamped to the side frame members 107 of the tractor are bent inwardly together at the bottom. Bracing bars 108 are secured to the frame members 107 and to the lower ends of the bars 106. A casting 109 is pivotally secured on a horizontal axis between the lower ends of the bars 106 on a shaft 110. The casting extends substantially vertically above and below its pivot axis. A frame structure 111 is rigidly secured to the bottom of the casting 109 for carrying the rear planter unit in a manner similar to the previously described arrangement, as shown in Figure 4. A shaft 112 is rotatably mounted in the upper portion of the casting 109. Two chain sprockets 113 and 114 are mounted on the shaft 112. The chain sprocket 114 is in alignment with a chain sprocket 115, which is adapted to be mounted on a rear planter unit similar to the chain sprocket 99 shown in Figure 4. A jack shaft 116 is mounted on brackets 117 secured to the bars 106 as close to the frame members 107 as feasible. The shaft 116 is driven by a chain sprocket 118 mounted thereon and a chain 119 positioned to operatively connect the chain sprocket 118 with a chain sprocket 102 mounted on a shaft 121. The shaft 121 is the same as the shaft 89 shown in Figure 5, and is driven in the same manner. A chain sprocket 122 on the shaft 116 in alignment with the sprocket 113 provides means for driving the shaft 112. Chain sprockets 123 at the ends of the jack shaft 116 provide means for driving the forward planter units, as previously described.

In the operation of this device, the seed hoppers are filled and the seeding mechanism is put into operation by operation of the jack shaft 92, the forward units being operated by the shafts 58, and the rear unit by the shaft 100. It will be noted that the frame structure of the trailing unit is pivoted on an axis very close to the axis of rotation of the jack shaft 92 and in substantially the same horizontal plane. Due to this construction, the rear unit may move up and down sufficiently for adjustment and for accommodation to irregularities in the soil without altering the tension on the chain 101 an appreciable degree. The axis of the jack shaft 92 is slightly above the axis of attachment of the frame structure on the shaft 61. This allows the complete planter and seed depositing unit to be lifted without putting undue tension on the chain 101.

In the modification as shown in Figures 8 and 9, the operation is substantially the same. Due to the fact that the bars 106 are tapered in at the bottom and that the shaft 112 is positioned higher than in the previously described form, there is more clearance under the tractor. Due to the additional shaft 112, for which member there is no equivalent in the previously described form, the action is somewhat different when the rear planter unit is raised and lowered. The casting 109 being rigid with respect to the frame structure of the rear planter unit, there is no alteration in the length between the center of the chain sprockets 113 and 114 when the vertical position of the rear units is altered. The swinging in this form takes place as the chain sprocket 113 oscillates about the pivot axis formed by the shaft 110. Due to the comparatively small distance between the shaft 110 and the shaft 112, the change in the distance between the centers of the sprockets 113 and 114 is not sufficient to require an idler on the chain connecting said sprockets.

The bars 45 are attached to the frame structures of the forward units and to the beams 30 for lifting the said units out of operative position or for adjusting the depth at which the furrow opening means operate. By connecting the lifting linkage for the forward units and the trailing unit to the same operating lever 31, all of the units may be lowered, lifted, or adjusted simultaneously.

Modifications may be made in the particular means for carrying out the different operations necessary for the functioning of this device. It is to be understood that applicant has shown a preferred embodiment of his improved planter construction and that he claims as his invention all modifications falling within the scope of the appended claims.

What is claimed is:

1. A tractor mounted and operated multiple row planter comprising a plurality of spaced seeding mechanisms mounted laterally at the forward end of the tractor frame, an intermediate seeding mechanism mounted at the rear of the tractor frame, and means operable from a power take-off connection with the tractor drive for operating all of said mechanisms.

2. A device as set forth in claim 1, in which the operating mechanism consists of a transverse shaft mounted on the tractor frame intermediate its ends, driving means extending forwardly therefrom to the side attached seeding mechanisms, and driving means extending rearwardly therefrom to the intermediate seeding mechanism.

3. A tractor mounted and operated multiple row planter comprising, in combination with the tractor frame, a supporting beam mounted at the front thereof, spaced furrow opening and seed depositing means individually pivotally mounted at each side of the frame on the supporting beam, links pivotally connected to the seed depositing means and to the tractor frame to prevent lateral displacement of said means with respect to each other and with respect to the frame, a transversely extending frame structure rigidly secured to the frame above said means, seed dispensing mechanisms mounted on said structure laterally thereof, means for conveying seed from said mechanisms to said depositing means, and means for operating said seed dispensing mechanisms.

4. A tractor mounted and operated multiple row planter comprising, in combination with the tractor frame, a supporting beam mounted at the front thereof, spaced furrow opening and seed depositing means individually pivotally mounted at each side of the frame on the supporting beam, a transversely extending frame structure rigidly secured to the frame above said means, seed dispensing mechanisms mounted on said structure laterally thereof, means for conveying seed from said mechanisms to said depositing means, and means for operating said seed dispensing mechanisms, said forward dispensing and depositing means being spaced apart the distance of two rows and an intermediate seed depositing means mounted at the rear of the tractor frame on a line midway between said front seed depositing means.

In testimony whereof I affix my signature.

ALEXUS C. LINDGREN.